(12) United States Patent
Okada et al.

(10) Patent No.: US 11,286,839 B2
(45) Date of Patent: Mar. 29, 2022

(54) METHOD FOR REUSING VEHICULAR CATALYST

(71) Applicant: TOYOTA JIDOSHA KABUSHIKI KAISHA, Toyota (JP)

(72) Inventors: Tsuyoshi Okada, Nagoya (JP); Masaru Kakinohana, Toyota (JP); Fukutaroh Mori, Anjou (JP); Shogo Shirakawa, Toyota (JP); Yuriko Takahashi, Miyoshi (JP); Masashi Nose, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/189,852

(22) Filed: Mar. 2, 2021

(65) Prior Publication Data
US 2021/0285357 A1    Sep. 16, 2021

(30) Foreign Application Priority Data
Mar. 11, 2020 (JP) .............................. JP2020-042368

(51) Int. Cl.
F01N 11/00 (2006.01)
(52) U.S. Cl.
CPC ........ F01N 11/007 (2013.01); F01N 2550/02 (2013.01)

(58) Field of Classification Search
CPC .. F01N 11/00; F01N 2900/1621; F01N 9/007; F01N 11/007; F01N 2550/02
See application file for complete search history.

(56) References Cited

U.S. PATENT DOCUMENTS

| 10,920,648 | B2 * | 2/2021 | Sakurai | ................... F01N 11/00 |
| 2010/0115920 | A1 * | 5/2010 | Bloms | ..................... F01N 11/00 60/277 |
| 2011/0232269 | A1 | 9/2011 | Inoue | |

FOREIGN PATENT DOCUMENTS

WO    2011/099164 A1    8/2011

\* cited by examiner

Primary Examiner — Anthony Ayala Delgado
(74) Attorney, Agent, or Firm — Oliff PLC (57) ABSTRACT

A method for reusing a vehicular catalyst that ensures effective reuse of a catalyst discarded when a vehicle is discarded is provided. A catalyst deterioration level of a catalytic converter is diagnosed, a catalyst that has a value of the deterioration level diagnosed to be smaller than a predetermined value is determined as a reusable catalyst, and the catalytic converter that includes the catalyst determined as the reusable catalyst is removed from a discarded vehicle. The removed catalytic converter is stored in association with a vehicle type and a manufacturing time of the discarded vehicle. When an abnormality occurs in a catalyst of a drivable vehicle corresponding to the vehicle type and the manufacturing time, a catalytic converter that includes the abnormal catalyst is replaced with the stored catalytic converter.

4 Claims, 7 Drawing Sheets

| Identification Number | Rank A (Piece) | Rank B (Piece) | Rank C (Piece) | Stock Quantity (Piece) | Number of Drivable Vehicles (Unit) |
|---|---|---|---|---|---|
| ID01 | A1 | B1 | C1 | N1 | M1 |
| ID02 | A2 | B2 | C2 | N2 | M2 |
| ID03 | A3 | B3 | C3 | N3 | M3 |
| ID04 | A4 | B4 | C4 | N4 | M4 |
| | | | | | |

FIG. 8

METHOD FOR REUSING VEHICULAR CATALYST

CROSS REFERENCE TO RELATED APPLICATIONS

The present application claims priority from Japanese patent application JP 2020-042368 filed on Mar. 11, 2020, the entire content of which is hereby incorporated by reference into this application.

BACKGROUND

Technical Field

The present disclosure relates to a method for reusing a vehicular catalyst mounted in a discarded vehicle.

Background Art

Conventionally, a vehicle includes an exhaust gas purification device to purify an exhaust gas discharged from an engine of the vehicle. The exhaust gas purification device includes a catalyst that purifies the exhaust gas from the engine. WO 2011/099164 discloses diagnosing deterioration of the catalyst using a Cmax method and the like. However, even when the catalyst is less deteriorated, the catalyst is discarded together with the vehicle when the vehicle is discarded.

SUMMARY

However, since the catalyst generally has a product lifetime longer than that of the vehicle, it is considered that the catalyst has a sufficient utility value. Therefore, effective use of the generally expensive catalyst is beneficial.

The present disclosure has been made in view of such an aspect and provides a method for reusing a vehicular catalyst that ensures effective reuse of a catalyst discarded when a vehicle is discarded.

In view of the above-described aspect, a method for reusing a vehicular catalyst comprises: diagnosing a catalyst deterioration level of a catalytic converter for the catalytic converter mounted in a discarded vehicle; determining a catalyst that has a value of the deterioration level diagnosed to be smaller than a predetermined value as a reusable catalyst; removing the catalytic converter that includes the catalyst determined to be the reusable catalyst from the discarded vehicle; storing the removed catalytic converter in association with a vehicle type and a manufacturing time of the discarded vehicle; and replacing a catalytic converter that includes an abnormal catalyst with the stored catalytic converter when the abnormality occurs in the catalyst of a drivable vehicle corresponding to the vehicle type and the manufacturing time.

According to the present disclosure, first, in the diagnosing, the catalyst deterioration level of the catalytic converter is diagnosed for the catalytic converter mounted in the discarded vehicle. In this diagnosing, the catalyst deterioration level (degree of deterioration) is diagnosed in a state where the catalytic converter is mounted in the discarded vehicle, and the deterioration level is a quantified value.

Subsequently, since the catalyst that has the value of the deterioration level diagnosed to be smaller than the predetermined value is a catalyst that can purify an exhaust gas, it is determined as a reusable catalyst in the determining. Subsequently, the catalytic converter can be removed from the discarded vehicle in the removing after having determined whether the catalyst is reusable or not before the removing. Accordingly, the catalytic converter that includes a non-reusable catalyst needs not to be removed from the discarded vehicle and can be discarded in the state of being mounted in the discarded vehicle.

Subsequently, in the storing, the removed catalytic converter is stored in association with the vehicle type and the manufacturing time of the discarded vehicle. In the replacing, a catalytic converter that includes an abnormal catalyst is replaced with the stored catalytic converter when an abnormality occurs in a catalyst of a drivable vehicle corresponding to the vehicle type and the manufacturing time. Since the catalytic converters same in vehicle type and same in manufacturing time have the same mounting structure, by storing the reusable catalysts in the form of the catalytic converter, the catalyst can be easily replaced together with the stored catalytic converter in a drivable vehicle that includes a catalyst not functioning normally. Thus, the catalyst discarded when the vehicle is discarded can be effectively reused.

In some embodiments, a stock quantity of the catalytic converter stored in the storing may be recorded based on a count of the catalytic converters removed in the removing and a count of the catalytic converters replaced in the replacing, and whether the removal of the catalytic converter is allowed or not is determined based on a count of the drivable vehicles corresponding to the vehicle type and the manufacturing time and the stock quantity in the removing.

According to this aspect, whether the removal of the catalytic converter is allowed or not can be determined based on the stock quantity of the catalytic converter that includes the reusable catalyst and the count of the drivable vehicles whose catalytic converter is replaceable therewith in the removing. For example, when the stock quantity of the catalytic converter is a predetermined proportion or more relative to the number of the drivable vehicles, the catalytic converter is sufficiently stored (secured). Accordingly, in this case, since the catalytic converter needs not to be excessively stored, the catalytic converter is not removed. Meanwhile, when the stock quantity of the catalytic converter is less than the predetermined proportion relative to the number of the drivable vehicles, the stored catalytic converter possibly becomes insufficient when an abnormality occurs in the catalyst. Accordingly, in the removing, the catalytic converter is removed and stored.

In some embodiments, the catalyst may be ranked depending on the deterioration level of the catalyst in the determining, the catalytic converter is stored while further associating the rank of the catalyst with the vehicle type and the manufacturing time of the discarded vehicle from which the catalytic converter is removed in the storing, and the catalytic converter with a low rank in the deterioration level is preferentially used in the replacing.

According to this aspect, since the catalytic converter that includes the catalyst with a low rank in the deterioration level is preferentially used among the catalysts ranked depending on the catalyst deterioration levels, the catalyst having a high purification efficiency can be reused.

In some embodiments, the catalytic converters may be collected and stored at a plurality of points, and storage points are recorded for the respective stored catalytic converters in the storing, and the catalytic converter at the storage point that has a closest distance from a replacement point of the catalytic converter is used in the replacing.

According to this aspect, a plurality of catalytic converters are collected and stored at a plurality of points in the storing, the storage point that has the closest distance from a replacement point of the catalytic converter is selected among the storage points in the replacing, and the catalytic converter to be reused can be conveyed to the replacement point. Accordingly, the logistics cost of the catalytic converter can be reduced to reduce the replacement cost of the catalytic converter.

According to the present disclosure, the catalyst discarded when the vehicle is discarded can be effectively reused.

DETAILED DESCRIPTION

The following describes a method for reusing a vehicular catalyst according to the embodiment of the present disclosure by referring to FIG. 1 to FIG. 8.

1. Outline of Method for Reusing Vehicular Catalyst

First, by referring to FIG. 1, the method for reusing the vehicular catalyst (hereinafter referred to as "catalyst") in the embodiment will be briefly described. In the reusing method according to the embodiment, when a discarded vehicle 1A is carried in a maintenance factory 2, a catalyst (specifically, a catalytic converter 80) mounted in the discarded vehicle 1A is removed to be reused.

Figure 3:
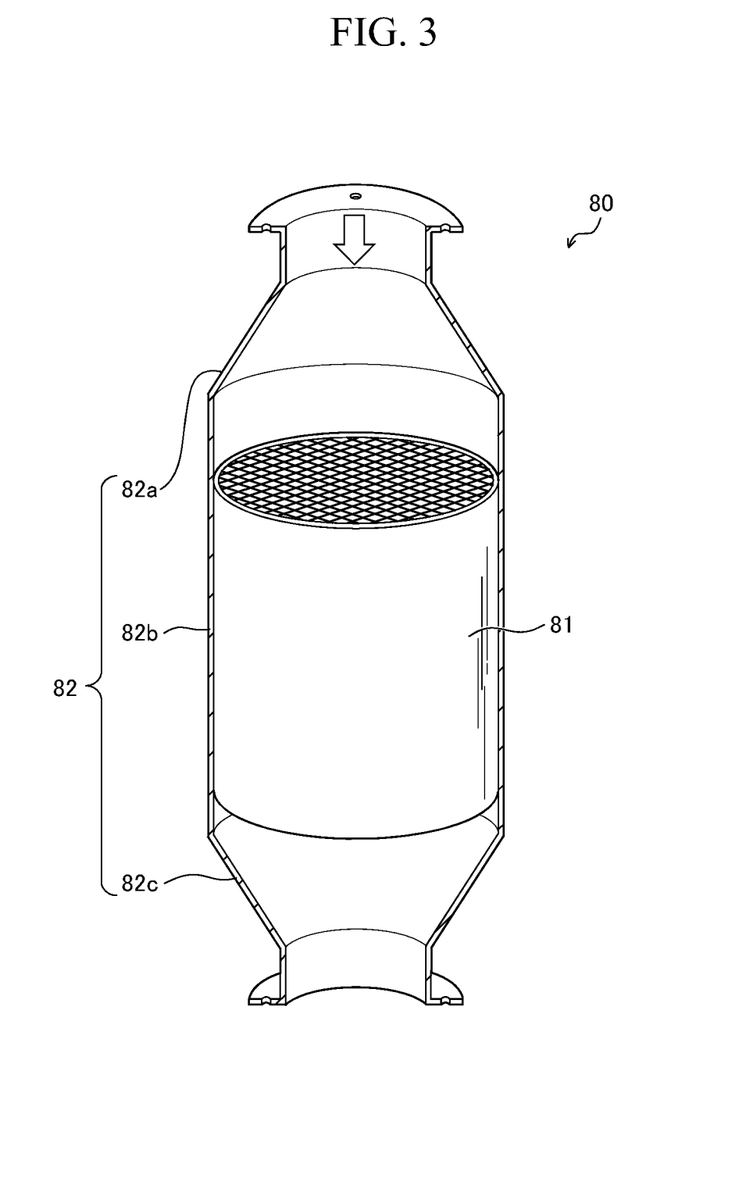
FIG. 3 is a schematic diagram of a catalytic converter that includes the vehicular catalyst illustrated in FIG. 2.

Specifically, when the discarded vehicle 1A is carried in the maintenance factory 2, a deterioration level of the catalyst mounted in the discarded vehicle 1A is diagnosed, and a catalytic converter 80 including a reusable catalyst is replaced with a catalytic converter 80 of a drivable vehicle 1B carried in a maintenance factory 4. In FIG. 1, the catalytic converter 80 illustrated in FIG. 3 is illustrated as a replacement target.

First, in the maintenance factory 2 in which the discarded vehicle 1A is carried, a deterioration diagnosis of the catalyst described later is performed, and a diagnostic result is transmitted to a management system 10 from a terminal 21 in the maintenance factory 2 via a network 6. The management system 10 determines whether the catalytic converter 80 including the catalyst is to be removed from the discarded vehicle 1A carried in the maintenance factory 2 or not, based on the diagnostic result and management information described later.

When the determination by the management system 10 is the removal, the management system 10 notifies the terminal 21 in the maintenance factory 2 of a removal command via the network 6. Accordingly, in the maintenance factory 2, the catalytic converter 80 including the catalyst is removed from the discarded vehicle 1A, and this catalytic converter 80 is conveyed to a catalyst storage warehouse 3.

Here, for example, when an abnormality occurs in the catalyst mounted in the drivable vehicle 1B, the vehicle 1B is carried in the maintenance factory 4. At this time, a replacement request of the catalytic converter 80 is transmitted to the management system 10 from a terminal 41 in the maintenance factory 4 via the network 6. When receiving the replacement request, the management system 10 transmits a replacement command including information on the catalytic converter 80 to be conveyed to the maintenance factory 4 to a terminal 31 in the catalyst storage warehouse 3. From the catalyst storage warehouse 3 having received the replacement command, the catalytic converter 80 adapted to the vehicle 1B is conveyed to the maintenance factory 4. In the maintenance factory 4, the catalytic converter 80 of the vehicle 1B is replaced (exchanged) with the catalyst carried from the catalyst storage warehouse 3.

The above description is the outline of the method for reusing the catalyst. First, in a vehicle that includes a catalyst to be reused, an engine and the catalytic converter 80 including the catalyst will be described by referring to FIG. 2 and FIG. 3. Subsequently, by referring to FIG. 4 to FIG. 8, the management system 10 to execute the reusing method will be described and an exemplary method for reusing the catalyst will be described.

2. Engine 7 and Catalytic Converter 80

Figure 2:
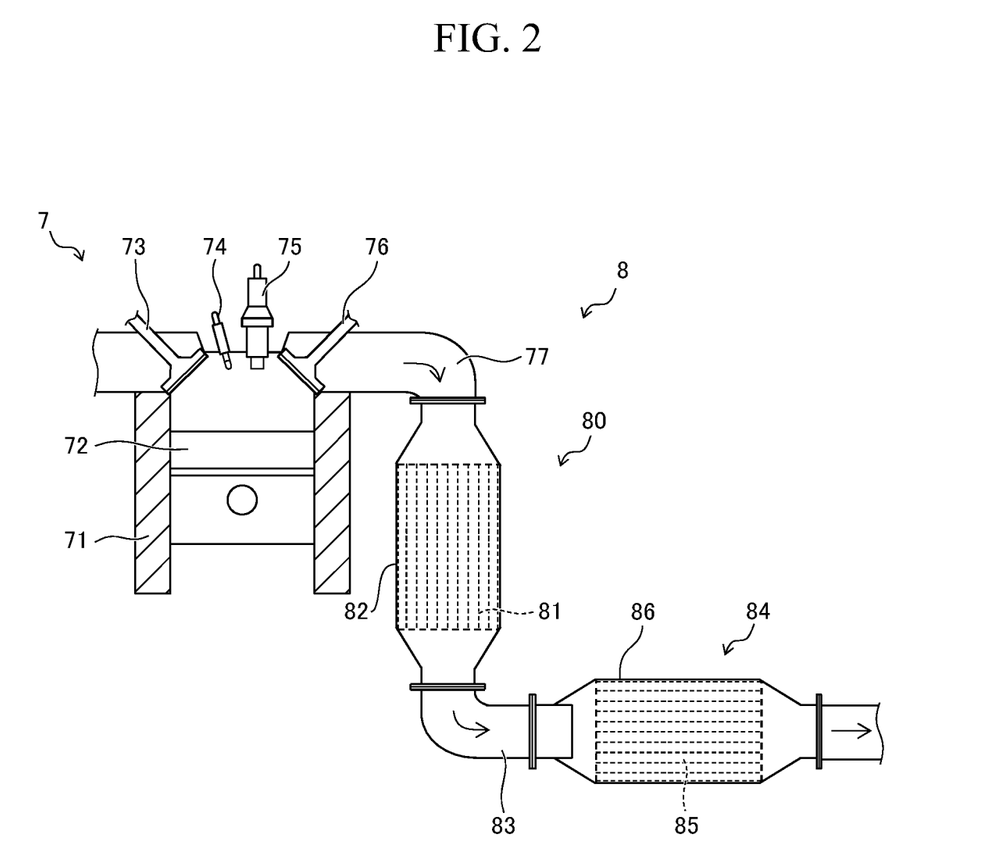
FIG. 2 is a cross-sectional view of a main part of a vehicle that includes the vehicular catalyst.

As illustrated in FIG. 2, in the engine 7, an air suctioned via an air intake valve 73 flows in a combustion chamber formed by a cylinder block 71 and a piston 72, and is mixed with a fuel (gasoline) injected by a fuel injection valve 74. The mixed air-fuel mixture is ignited by a spark plug 75 to be burnt in the combustion chamber, and an exhaust gas after burning is discharged from an exhaust manifold 77 via an exhaust valve 76.

The exhaust gas discharged from the exhaust manifold 77 is purified by an exhaust gas purification device 8. Specifically, the exhaust gas purification device 8 includes the catalytic converter 80 connected to the exhaust manifold 77 and a catalytic converter 84 connected to the catalytic converter 80 in the downstream side of the catalytic converter 80.

The catalytic converter 80 includes a catalyst 81 that purifies the exhaust gas from the exhaust manifold 77 and a housing 82 that houses the catalyst 81. The second catalytic converter 84 similarly includes a catalyst 85 that further purifies the exhaust gas that cannot be completely purified by the first catalytic converter 80 and a housing 86 that houses the catalyst 85. The housings 82, 86 are made of a metallic material, such as a stainless steel, a carbon steel, or aluminum.

In this embodiment, the catalytic converter 80 in the upstream side of the exhaust gas and the catalytic converter 84 in the downstream side of the exhaust gas employ the same configuration. The following describes the configuration of the catalytic converter 80 in the upstream side in detail, and the description of the configuration of the catalytic converter 84 in the downstream side will be omitted. In addition, the method for reusing the catalyst 81 of the catalytic converter 80 in the upstream side will be described as an example, and the detail description of the method for reusing the catalyst 85 will be omitted because it is similar.

As illustrated in FIG. 3, the housing 82 of the catalytic converter 80 includes an inlet cone portion 82a, a trunk portion 82b, and an outlet cone portion 82c. The exhaust gas from the exhaust manifold 77 flows in the inlet cone portion 82a, and the inlet cone portion 82a has a cone shape in which a cross section of an exhaust gas flow passage is enlarged from the upstream side toward the downstream side of the exhaust gas. The trunk portion 82*b* is formed continuous to the inlet cone portion 82*a* in the upstream side of the exhaust gas flow and has a tubular shape in which the cross section of the exhaust gas flow passage is constant. The outlet cone portion 82*c* is formed continuous to the trunk portion 82*b* in the upstream side of the exhaust gas flow, and has a cone shape in which the cross section of the exhaust gas flow passage is decreased from the upstream side toward the downstream side of the exhaust gas. The catalyst 81 is disposed inside the trunk portion 82*b*.

In this embodiment, since the engine 7 is a gasoline engine, the catalyst 81 is a three-way catalyst that removes hydrocarbon (HC), carbon monoxide (CO), and nitrogen oxides (NOx) of the exhaust gas of the gasoline engine.

The catalyst 81 includes a carrier (catalyst carrier) on which a metal catalyst to purify the exhaust gas is supported. The carrier may be made of any material of a ceramic material or a metallic material. The ceramic material can include a porous ceramic material mainly containing any one of alumina, zirconia, cordierite, titania, silicon carbide, silicon nitride, or the like. In some embodiments, the metallic material may be a material having a heat resistance and a corrosion resistance, and can include a stainless steel, aluminum, and the like.

In this embodiment, for example, the carrier of the catalyst 81 has a columnar shape, is made of a ceramic material, and is a carrier of a honeycomb structure including a plurality of cells through which the exhaust gas passes.

The metal catalyst of the catalyst 81 is granular and supported on inner wall surfaces forming the cells of the catalyst 81 via the ceramic material. As a metal employed as the metal catalyst, a noble metal containing at least one of platinum, rhodium, or palladium is selected. The ceramic material that supports the catalytic metal on the carrier can include a mixed material or the like, for example, zirconia and alumina, ceria and alumina, or ceria-zirconia and alumina. For supporting the metal catalyst on the carrier, the carrier is coated with a slurry that includes the ceramic material and the metal catalyst described above and firing it.

The catalyst 81 thus mounted in the discarded vehicle 1A is removed from the discarded vehicle 1A in the form of the catalytic converter 80. Generally, since the catalyst 81 generally has a product lifetime longer than that of the vehicle, the catalyst 81 removed from the discarded vehicle 1A has a sufficient utility value as a catalyst. Generally, among the vehicles of the same vehicle type and the same manufacturing period, the shape and the structure of the catalytic converter 80 including the catalyst 81 are the same. Accordingly, by removing the reusable catalyst 81 in the form of the catalytic converter 80, the catalytic converter of the vehicle 1B of the same vehicle type and the same manufacturing time can be replaced therewith.

3. Method for Reusing Catalyst

Figure 4:
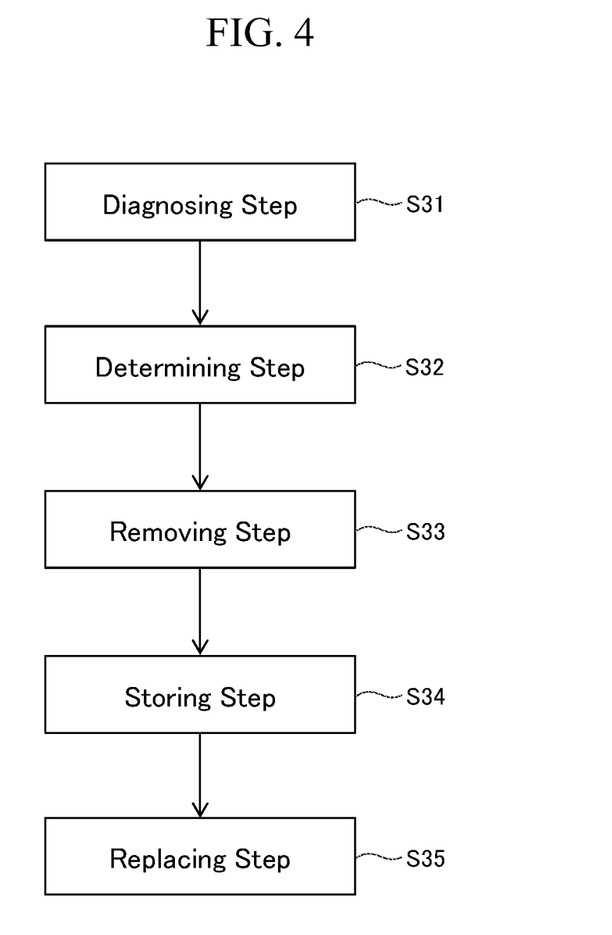
FIG. 4 is a flowchart of the method for reusing the vehicular catalyst according to the embodiment.

The following describes the method for reusing the catalyst 81. FIG. 4 is a flowchart of the reuse of the catalyst 81 according to the embodiment.

3-1. Diagnosing Step S31

For the catalytic converter 80 mounted in the discarded vehicle 1A, the deterioration level of the catalyst 81 of the catalytic converter 80 is diagnosed. Specifically, in the maintenance factory 2 in which the discarded vehicle 1A is carried, the deterioration level of the catalyst 81 described later is quantified, thereby diagnosing its deterioration level.

For example, since the deterioration of the catalyst 81 progresses corresponding to a driving distance of the vehicle, the deterioration level of the catalyst 81 may be, for example, a value that is set corresponding to a length of the driving distance of the discarded vehicle 1A.

It can be said that the higher an activation temperature of the catalyst is, the more the deterioration of the catalyst has been progressed, and a long activation period can be said to mean the progress of the catalyst deterioration. Accordingly, a value indicating the deterioration level may be an integral value of the activation temperature of the catalyst in the activation period of the catalyst 81 in a period from a state of a new vehicle to the disposal of the discarded vehicle 1A, or a value that is set corresponding to it.

In addition, when the engine 7 is startable, in the maintenance factory 2, a Cmax method may be used to measure an oxygen storage capacity (Cmax) of the catalyst 81 from the state illustrated in FIG. 2, thus performing the deterioration diagnosis of the catalyst 81. In this case, a value corresponding to the oxygen storage capacity may be employed as the catalyst deterioration level. In the Cmax method, an air-fuel ratio control in which an air-fuel ratio is vibrated around a stoichiometric ratio, thereby forcibly changing an air-fuel ratio of the exhaust gas flowing in the catalyst 81 between a lean side and a rich side is performed. In this air-fuel ratio control, the oxygen storage capacity of the catalyst 81 can be calculated from an output value of an oxygen sensor (not illustrated) disposed in the downstream side of the catalyst 81.

Figure 1:
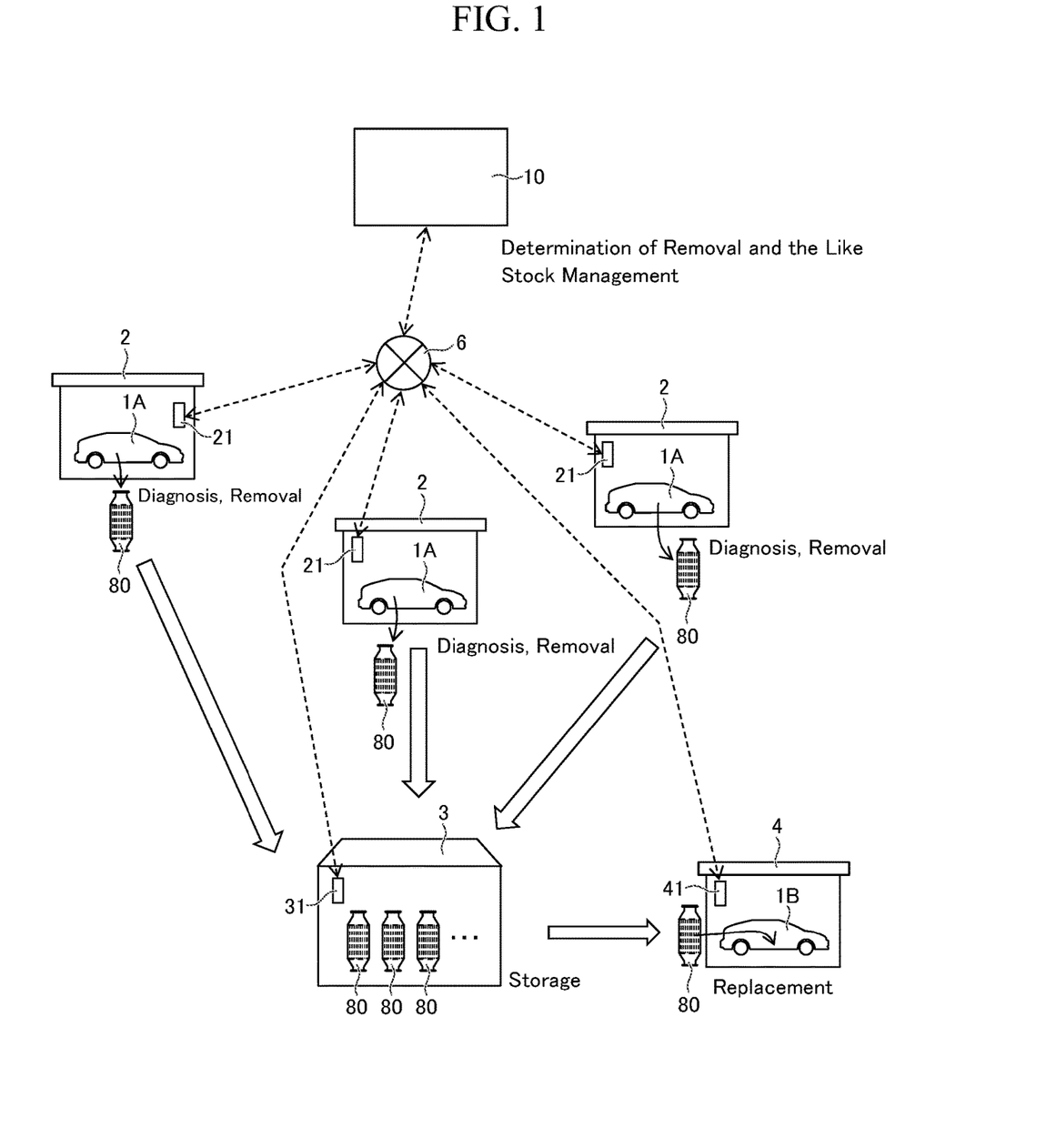
FIG. 1 is a schematic conceptual diagram for describing a method for reusing a vehicular catalyst according to an embodiment of the disclosure.

Thus, in the diagnosing step S31, the value of the deterioration level of the catalyst 81 mounted in the discarded vehicle 1A is associated with the vehicle type and the manufacturing time of the discarded vehicle 1A and transmitted to the management system 10 from the terminals 21 in the respective maintenance factories 2 via the network 6 as illustrated in FIG. 1. Note that immediately after the diagnosing step S31, the catalytic converter 80 including the catalyst 81 remains to be mounted in the discarded vehicle 1A.

3-2. Determining Step S32

Figure 5:
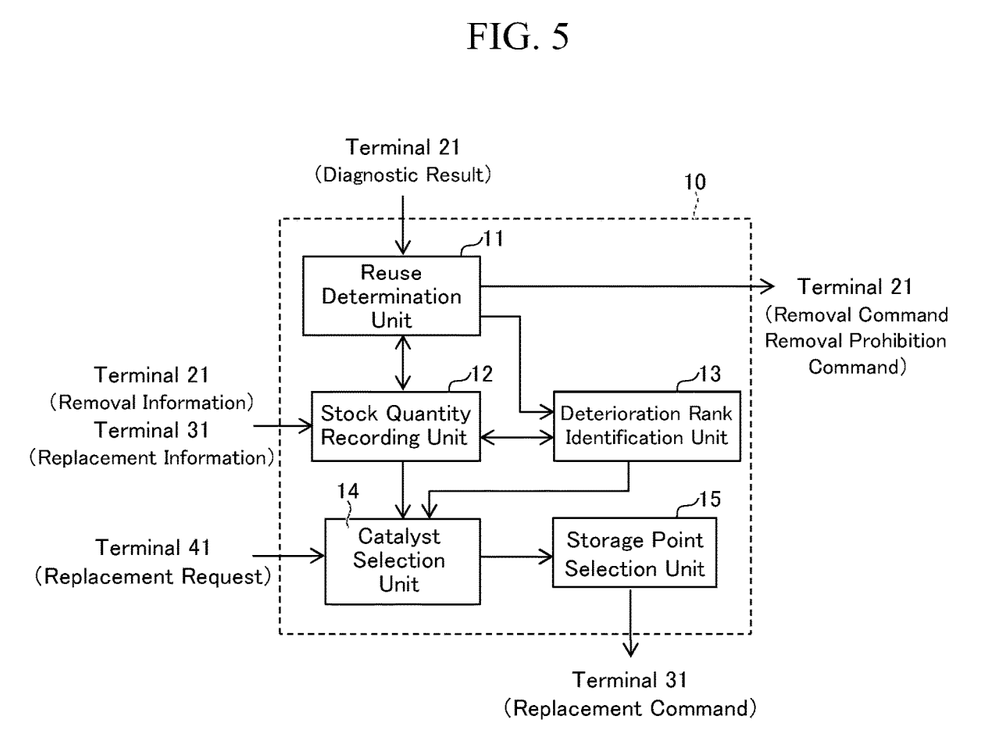
FIG. 5 is a control block diagram of a management system illustrated in FIG. 1.

In the determining step S32, the catalyst 81 whose value of the deterioration level calculated in the diagnosing step S31 has been diagnosed to be smaller than a predetermined value is determined as a reusable catalyst. As illustrated in FIG. 5, the management system 10 includes a reuse determination unit 11 as software. The management system 10 further includes a stock quantity recording unit 12, a deterioration rank identification unit 13, a catalyst selection unit 14, and a storage point selection unit 15 described later as software.

Figure 6:
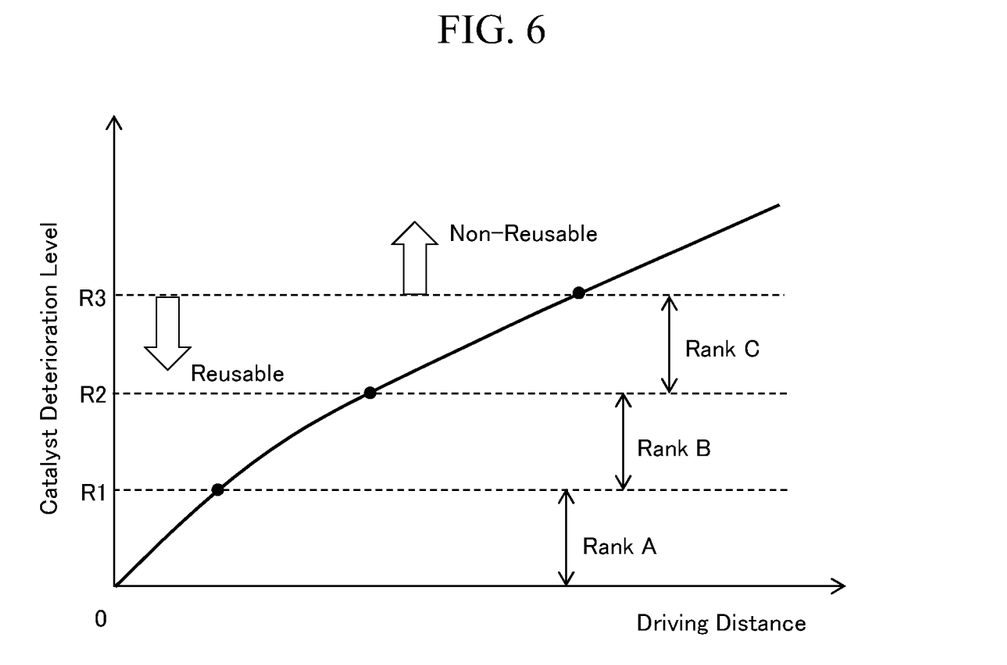
FIG. 6 is a graph for describing ranking of a catalyst deterioration level.

The reuse determination unit 11 receives the value of the deterioration level of the catalyst 81 as the diagnostic result from the terminal 21 in the maintenance factory 2, and determines whether the catalyst 81 is a reusable catalyst or not based on the received value of the deterioration level of the catalyst 81. Specifically, as illustrated in FIG. 6, the catalyst 81 whose value of the catalyst deterioration level is diagnosed to be smaller than R3 (predetermined value) is determined as the reusable catalyst. Meanwhile, when the value of the catalyst deterioration level is R3 or more, the catalyst 81 carried in the maintenance factory 2 is determined to be non-reusable.

Subsequently, the reuse determination unit 11 notifies the terminal 21 in the maintenance factory 2 of a removal command of the catalytic converter 80 including the catalyst 81 when the catalyst 81 is determined to be reusable. Meanwhile, the reuse determination unit 11 notifies the terminal 21 in the maintenance factory 2 of a removal prohibition command of the catalytic converter 80 including the catalyst 81 when the catalyst 81 is determined to be non-reusable.

When the reuse determination unit 11 determines the catalyst 81 to be reusable, the reuse determination unit 11 transmits the value of the deterioration level of the catalyst 81 to the deterioration rank identification unit 13. The deterioration rank identification unit 13 ranks the catalyst corresponding to the quantified deterioration level of the catalyst. Specifically, as illustrated in FIG. 6, a case where the value of the catalyst deterioration level is 0 or more and less than R1 is evaluated to Rank A, a case where the value is R1 or more and less than R2 is evaluated to Rank B, and a case where the value is R2 or more and less than R3 is evaluated to Rank C. Since the greater the value of the catalyst deterioration level is, the more the catalyst deterioration has progressed, the progress of the catalyst deterioration is great in the order of Rank C, Rank B, and Rank A.

3-3. Removing Step S33

In the removing step S33, as illustrated in FIG. 1, the catalytic converter 80 that includes the catalyst 81 determined as the reusable catalyst is removed from the discarded vehicle 1A in the maintenance factory 2. Thus, since the catalytic converter 80 that includes the catalyst 81 determined as the reusable catalyst is removed from the discarded vehicle 1A, the catalytic converter 80 that includes the non-reusable catalyst can be discarded together with the discarded vehicle 1A.

3-4. Storing Step S34

In the storing step S34, the removed catalytic converter 80 is stored in association with the vehicle type and the manufacturing time of the discarded vehicle 1A. Specifically, as illustrated in FIG. 1, the catalytic converter 80 removed in the maintenance factory 2 is conveyed from the maintenance factory 2 to the catalyst storage warehouse 3. Furthermore, from the terminal 21 of the maintenance factory 2, as information on the removal of the catalytic converter 80, the vehicle type and the manufacturing time of the discarded vehicle 1A in which the catalytic converter 80 was mounted are transmitted to the management system 10.

Note that the manufacturing time means a period in which the vehicles of that vehicle type are manufactured (that is, a period in which one vehicle model is manufactured), and the catalytic converters 80 matching in vehicle type and manufacturing time are the same in type and shape of the catalyst 81 and mounting structure of the housing 82. Accordingly, the replacement of the catalytic converter in the vehicle of the same vehicle type and the same manufacturing time is facilitated.

The stock quantity recording unit 12 of the management system 10 receives information on the discarded vehicle 1A including the vehicle type and the manufacturing time of the discarded vehicle and removal completion of the catalytic converter 80 as removal information from the terminal 21. Simultaneously, the stock quantity recording unit 12 receives a rank of the reusable catalyst (that is, the removed catalyst 81) identified by the deterioration rank identification unit 13.

Figure 7:
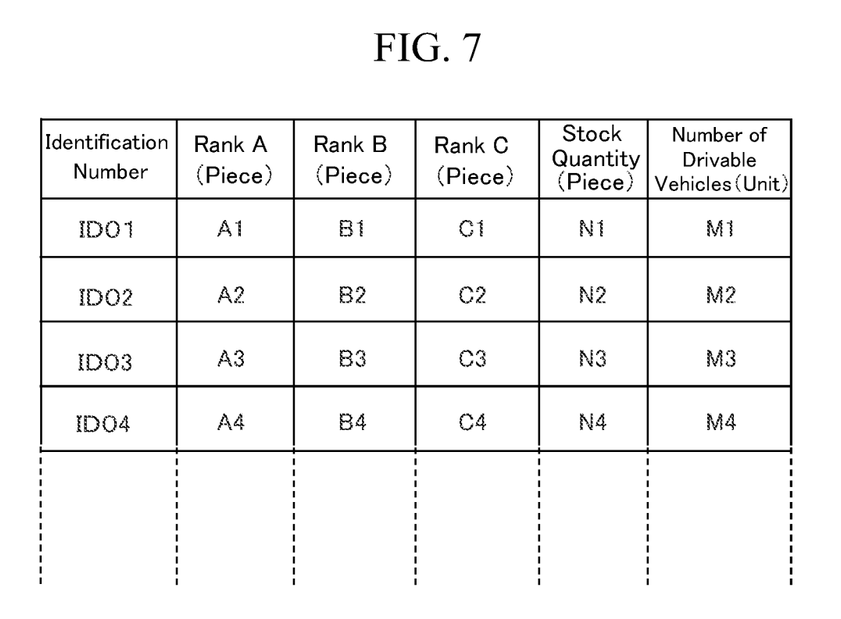
FIG. 7 is a table diagram for describing an exemplary recording method in a recording step in FIG. 4.

Accordingly, for example, as illustrated in FIG. 7, an identification number (specifically, ID01, ID02, □) set corresponding to the vehicle type and the manufacturing time of the discarded vehicle 1A from which the catalytic converter 80 is removed is further associated with the catalyst rank, thus managing the number of the catalysts for each rank.

For example, the identification number ID01 illustrated in FIG. 7 means a certain vehicle type and a type of the catalytic converter 80 mounted in the manufacturing time of this vehicle type. Among the catalytic converters 80 managed by the identification number ID01, the number of the catalytic converters 80 of Rank A in the catalyst deterioration level is A1, the number of those of Rank B is B1, and the number of those of Rank C is C1. The sum of these numbers is a stock quantity N1 of the catalytic converter 80. Thus, the catalytic converters 80 are stored in the catalyst storage warehouse 3 by the number same as the number recorded by the stock quantity recording unit 12.

Note that as illustrated in FIG. 7, the stock quantity recording unit 12 also records the number of drivable vehicles corresponding to the identification number, that is, drivable vehicles corresponding to the vehicle type and the manufacturing time. That is, the number of drivable vehicles is the number obtained by subtracting the number of discarded vehicles from the number of vehicles of a predetermined vehicle type and manufactured in a predetermined manufacturing time. For example, for the identification number ID01 illustrated in FIG. 7, the number of the drivable vehicles is M1.

Note that the identification numbers, the stock quantity of the catalytic converters 80 stored in the catalyst storage warehouse 3, and the like may be transmitted to the management system 10 together with the number of the catalysts 81 for each rank via the terminal 31, thereby regularly comparing the numbers of the respective catalytic converters recorded by the stock quantity recording unit 12 with the received numbers of the respective catalytic converters. As a result of the comparison, when those numbers do not match each other, the stock quantity recording unit 12 of the management system 10 performs a correction by replacing the recorded numbers with the received numbers of the respective catalytic converters.

Furthermore, the catalyst storage warehouse 3 is collected to one in FIG. 1. For example, as illustrated in a map M of FIG. 8, the catalytic converters 80 may be collected and stored in catalyst storage warehouses at a plurality of storage points P1, P2, P3 □, and the stock quantity recording unit 12 may record the storage points P1, P2, P3 □ for the respective stored catalytic converters 80 together with the stock quantity.

3-4. Replacing Step S35

In the replacing step S35, in a case of an abnormality of the catalyst of the drivable vehicle 1B corresponding to the vehicle type and the manufacturing time, the catalytic converter 80 that includes the abnormal catalyst is replaced with the catalytic converter 80 stored in the catalyst storage warehouse 3.

Specifically, as illustrated in FIG. 1, when the abnormality occurs in the catalyst mounted in the drivable vehicle 1B, this vehicle 1B is carried in the maintenance factory 4. At this time, the replacement request of the catalytic converter 80 is transmitted to the management system 10 from the terminal 41 in the maintenance factory 4 via the network 6.

When having received the replacement request, the catalyst selection unit 14 of the management system 10 transmits the replacement command including information on the catalytic converter 80 to be conveyed to the maintenance factory 4 corresponding to the vehicle type and the manufacturing time of the vehicle 1B to the terminal 31 in the catalyst storage warehouse 3.

In this embodiment, as illustrated in FIG. 7, since ranking is performed based on the catalyst deterioration level, the catalyst selection unit 14 preferentially selects the catalytic converter 80 with the low rank in the catalyst deterioration level. Specifically, the catalyst selection unit 14 selects the catalytic converter 80 in stock in the order of the catalysts of Rank A, Rank B, and Rank C.

By this selection, via the storage point selection unit 15 described later, the catalyst replacement command is transmitted to the terminal 31, and the catalytic converter 80 adapted to the vehicle 1B is conveyed from the catalyst storage warehouse 3 to the maintenance factory 4. In the maintenance factory 4, the catalytic converter 80 of the vehicle 1B is replaced with the one carried in from the catalyst storage warehouse 3. Thus, since the catalytic converter 80 with the low rank in the deterioration level is preferentially used among the catalytic converters 80 stored in the catalyst storage warehouse 3, the catalyst 81 having the high purification efficiency can be reused. The deterioration level of the catalyst 81 is ranked in this embodiment. The values of the deterioration level of the respective catalytic converters 80 may be recorded to use them in an ascending order of the value of the deterioration level.

Figure 8:
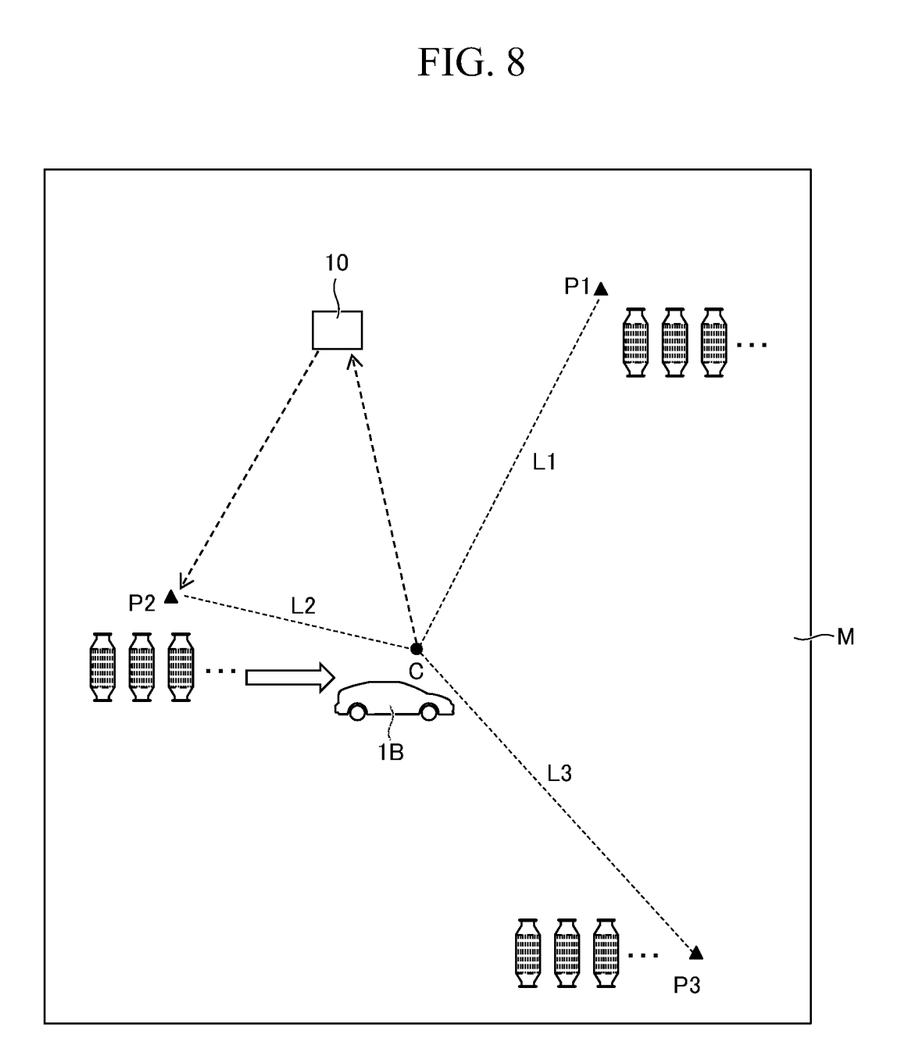
FIG. 8 is a schematic diagram for describing an exemplary replacement method in a replacing step in FIG. 4.

In this embodiment, as illustrated in FIG. 8, in the storing step S34, when the catalytic converters 80 are collected and stored at a plurality of storage points P1, P2, P3 □, the catalytic converter 80 at the storage point P2 having the closest distance from the replacement point of the catalytic converter 80 is used among the storage points P1, P2, P3.

Specifically, the storage point selection unit 15 calculates distances L1, L2, L3, □ between the storage points P1, P2, P3 □ and a replacement point C, respectively, from map coordinates of a plurality of storage points P1, P2, P3 □ at which the catalyst storage warehouses 3 exist and a map coordinate of the replacement point C at which the maintenance factory 4 exists. Subsequently, the storage point selection unit 15 selects the storage point P2 that has the shortest distance L2 among the distances L1, L2, L3, □, and identifies the above-described catalytic converter 80 to transmit the replacement command to the terminal 31 in the catalyst storage warehouse 3 at the storage point P2.

The storage point P2 that has the closest distance L2 from the replacement point C of the catalytic converter 80 can be selected among the storage points P1, P2, P3 □ to convey it to the replacement point C for the catalytic converter 80 is to be reused. Accordingly, a logistics cost of the catalytic converter 80 can be reduced to reduce a replacement cost of the catalytic converter 80.

4. Modifications

In the above-described embodiment, in the removing step S33, the catalytic converter 80 is removed based on the determination result by the reuse determination unit 11. However, furthermore, in the determination result, on the premise that the catalyst 81 is reusable, whether the catalytic converter 80 is removable or not may be determined based on the number of the drivable vehicles corresponding to the vehicle type and the manufacturing time and the stock quantity of the catalytic converter 80 replaceable for them illustrated in FIG. 7.

Specifically, when the stock quantity of the catalytic converter 80 is a predetermined proportion or more relative to the number of the drivable vehicles, the catalytic converter 80 needs not to be excessively stored. Therefore, even in the case of the catalytic converter 80 that includes the reusable catalyst 81, the catalytic converter 80 is not removed. Meanwhile, when the stock quantity of the catalytic converter 80 is less than the predetermined proportion relative to the number of the drivable vehicles, the stock of the catalytic converter 80 possibly becomes insufficient when abnormalities occur in the catalysts. Therefore, in this case, in the removing step S33, the catalytic converter 80 can be removed and stored.

While the one embodiment of the present disclosure has been described in detail above, the present disclosure is not limited thereto, and can be subjected to various kinds of changes in design without departing from the spirit or scope of the present disclosure described in the claims.

Note that while the maintenance factory in which the discarded vehicle is carried and the maintenance factory in which the catalytic converter is replaced are different maintenance factories in this embodiment, they may be the same maintenance factory.

What is claimed is:

1. A method for reusing a vehicular catalyst comprising:
   diagnosing a catalyst deterioration level of a catalytic converter for the catalytic converter mounted in a discarded vehicle;
   determining a catalyst that has a value of the deterioration level diagnosed to be smaller than a predetermined value as a reusable catalyst;
   removing the catalytic converter that includes the catalyst determined to be the reusable catalyst from the discarded vehicle;
   storing the removed catalytic converter in association with a vehicle type and a manufacturing time of the discarded vehicle; and
   replacing a catalytic converter that includes an abnormal catalyst with the stored catalytic converter when the abnormality occurs in the catalyst of a drivable vehicle corresponding to the vehicle type and the manufacturing time.

2. The method for reusing the vehicular catalyst according to claim 1,
   wherein a stock quantity of the catalytic converter stored in the step of storing is recorded based on a count of the catalytic converters removed in the step of removing and a count of the catalytic converters replaced in the replacing, and
   wherein whether the removal of the catalytic converter is allowed or not is determined based on a count of the drivable vehicles corresponding to the vehicle type and the manufacturing time and the stock quantity in the removing.

3. The method for reusing the vehicular catalyst according to claim 1,
   wherein the catalyst is ranked depending on the deterioration level of the catalyst in the determining,
   wherein the catalytic converter is stored while further associating the rank of the catalyst with the vehicle type and the manufacturing time of the discarded vehicle from which the catalytic converter is removed in the storing, and
   wherein the catalytic converter with a low rank in the deterioration level is preferentially used in the replacing.

4. The method for reusing the vehicular catalyst according to claim 1,
   wherein the catalytic converters are collected and stored at a plurality of points, and storage points are recorded for the respective stored catalytic converters in the storing, and
   wherein the catalytic converter at the storage point that has a closest distance from a replacement point of the catalytic converter is used in the step of replacing.

\* \* \* \* \*